United States Patent [19]

Uchida

[11] 4,289,399

[45] Sep. 15, 1981

[54] LIGHT SIGNAL OBSERVATION DEVICE

[75] Inventor: Kozo Uchida, Fussa, Japan

[73] Assignee: Iwasaki Tsushinki Kabushiki Kaisha, Japan

[21] Appl. No.: 65,502

[22] Filed: Aug. 10, 1979

[30] Foreign Application Priority Data

Aug. 12, 1978 [JP] Japan .................................. 53-98569
Aug. 12, 1978 [JP] Japan .................................. 53-98570
Aug. 12, 1978 [JP] Japan .................................. 53-98571
Aug. 12, 1978 [JP] Japan .................................. 53-98572

[51] Int. Cl.³ .............................. G01J 1/44; G01J 1/42
[52] U.S. Cl. ..................................... 356/226; 356/218
[58] Field of Search ....................... 356/226, 218, 223; 250/338

[56] References Cited

U.S. PATENT DOCUMENTS 4,043,676  8/1977  Holzinger et al. .................. 356/226

Primary Examiner—John K. Corbin
Assistant Examiner—Rodney B. Bovernick
Attorney, Agent, or Firm—Robert E. Burns; Emmanuel J. Lobato; Bruce L. Adams

[57] ABSTRACT

A light signal observation device, which is provided in combination with light receiving means for detecting a light signal, light intermitting means for intercepting or passing therethrough the light signal incident to the light receiving means, amplifying means for amplifying the output from the light receiving means; time base signal generating means for generating a sawtooth wave in synchronism with the light signal and also while the light signal is intercepted and for generating a luminance modulation signal in the period of generation of the sawtooth wave, and display means for displaying an optical signal waveform including a 0 level on the basis of the output signal from the amplifying means and the sawtooth signal and the luminance modulation signal from the time base signal generating means. The light signal observation device of this invention may be constructed as a synchroscope or a sampling oscilloscope.

34 Claims, 28 Drawing Figures

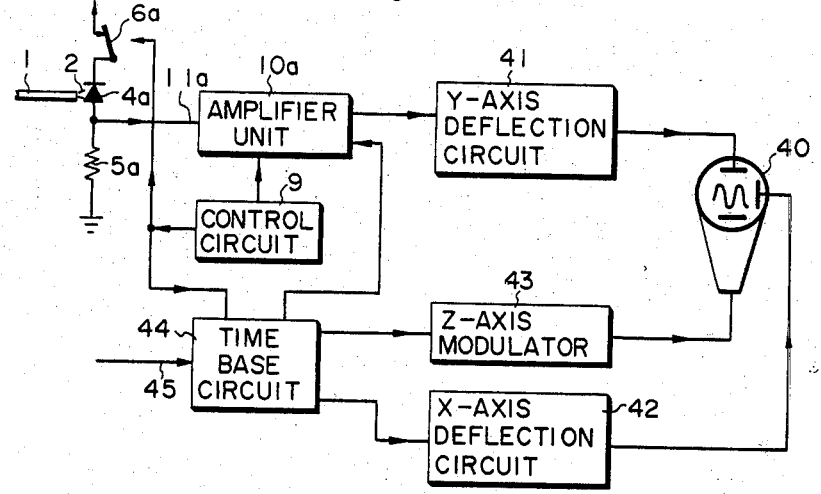
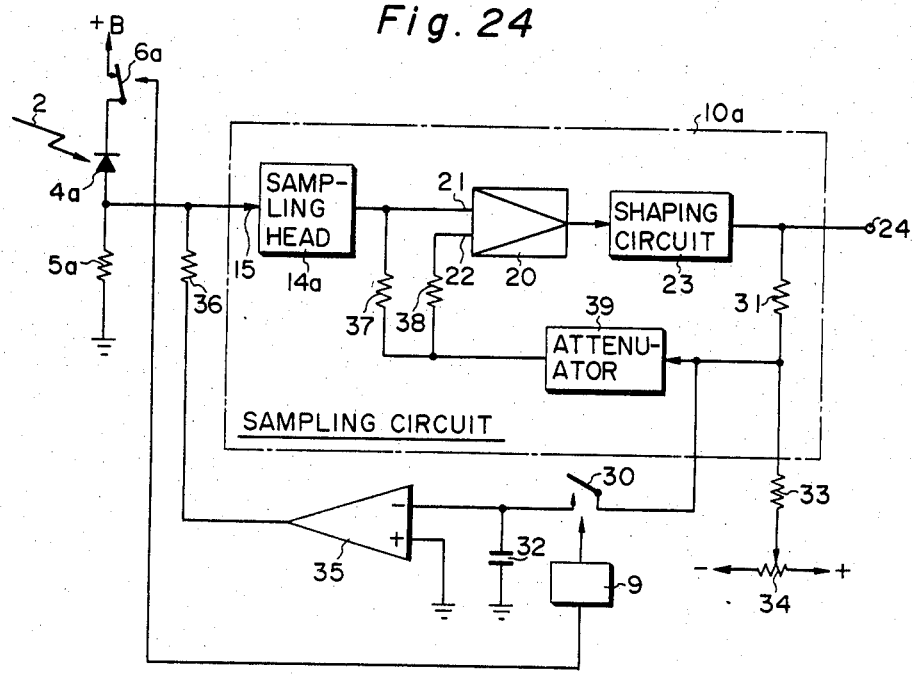

LIGHT SIGNAL OBSERVATION DEVICE

BACKGROUND OF THE INVENTION

1. Field of the Invention

This invention relates to a device for observing a light signal.

2. Description of the Prior Art

A light signal for use in light communications is usually intensity-modulated; but it is difficult to accurately observe what level or modulation degree the light has.

For converting a light signal into an electrical signal use is generally made of a PIN diode, an avalanche photo diode (APD) or the like. In such photo detectors for detecting light, a current when no incident light exists, that is, a dark current changes with various conditions, such as temperature, aging, a power source voltage and so forth; this degrades the accuracy of measurement most.

SUMMARY OF THE INVENTION

An object of this invention is to provide a light signal observation device which solves the abovesaid problem and permits accurate measurement of the level or modulation degree of light.

Another object of this invention is to provide a light signal observation device with which both the level of light and its modulated waveform can be measured and observed at the same time.

BRIEF DESCRIPTION OF THE DRAWING

The principle, construction and operation of this invention will be clearly understood from the following detailed description taken in conjunction with the accompanying drawings, in which:

FIG. 23 is a block diagram showing another embodiment of this invention;

FIG. 24 is a circuit diagram showing, by way of example, a photo detector and an amplifier unit employed in the device of this invention;

FIGS. 26, 27, 28 and 29 are circuit diagrams illustrating other examples of the photo detector and the amplifier unit employed in the device of this invention.

DESCRIPTION OF THE PREFERED EMBODIMENTS

Figure 1:
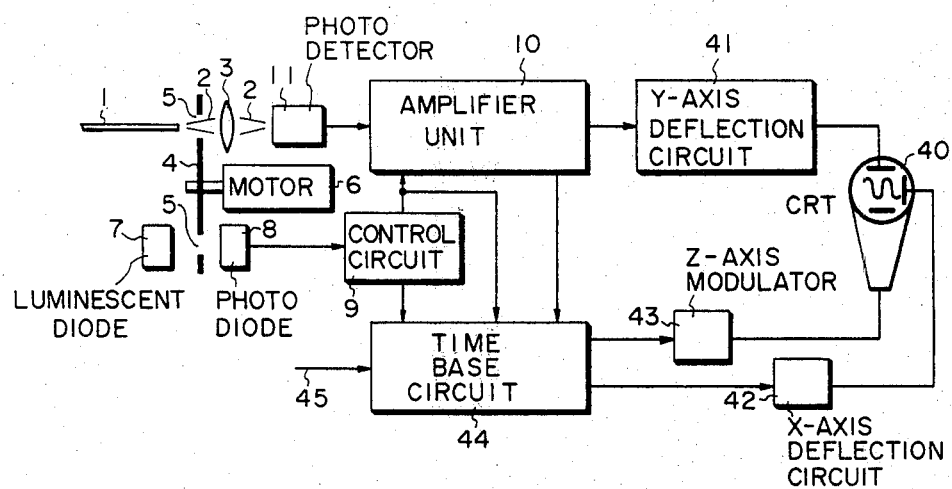
FIG. 1 is a block diagram showing an embodiment of this invention.

With reference to FIG. 1 showing an embodiment of the present invention contructed as a synchroscope, reference numeral 1 indicates an optical fiber having a diameter of about 100 μm for guiding a light signal; 2 designates a light emanating from the fiber 1; 3 identifies a lens; 4 denotes a rotary disc, which has holes 5 so that the light is intercepted by or passed through the disc; 6 represents a motor for driving the rotary disc 4; 11 shows a photo detector, such as a PIN diode, APD or the like; 10 refers to an amplifier unit for amplifying the output from the photo detector 11; 40 indicates a cathode-ray tube (CRT) for displaying a waveform; 41 and 42 designate deflection circuits for the Y-axis and the X-axis deflection of the CRT 40; 43 identifies a Z-axis modulator for applying a signal to the Z-axis of the CRT 40 to perform intensity modulation; 44 denotes a time base circuit; 45 represents an input terminal for applying a synchronizing signal to the time base circuit 44; 7 shows a luminescent diode; 8 refers to a photo diode for receiving a light emitted from the luminescent diode 7, the both diodes being oppositely disposed to the rotary disc 4 and the light emanating from the luminescent diode 7 being also intercepted by or passed through the rotary disc 4 in synchronism with the light 2 from the fiber 1 being intercepted by or passed through the rotary disc 4 having the holes 5; and 9 indicates a control circuit for controlling the amplifier 10 and the time base circuit 44. The output from the photo diode 8 is applied to the control circuit 9, which operates to apply its output to the amplifier unit 10 and the time base circuit 44 when the light 2 from the fiber 1 is intercepted by or passed through the rotary disc 4.

Figure 2:
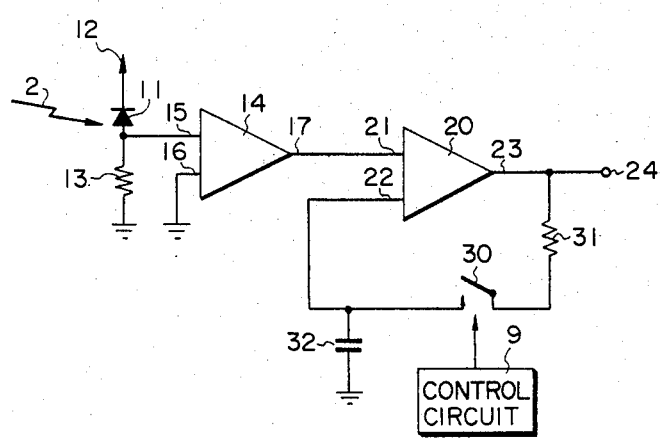
FIG. 2 is a circuit diagram showing by way of example, a photo detector and an amplifier unit employed in the device of this invention.

An example of a circuit arrangement in which the output from the photo detector 11 is outputted via the amplifier unit 10 is shown in FIG. 2 and its operation will be described in detail.

In FIG. 2, the same parts as those in FIG. 1 are identified by the same reference numerals; therefore, no description will be given of them. Reference numeral 12 indicates a bias source for the photo detector 11; 13 and 31 designates resistors; 14 and 20 identify differential amplifiers, which are respectively provided with input terminals 15, 16 and 21, 22 and output terminals 17 and 23; 30 and 32 respectively identify a switch and a capacitor, which make up a low-pass filter in combination with a resistor 31; and 24 denotes an output terminal of the amplifier unit 10.

When no light 2 is incident to the photo detector 11, the switch 30 is held in the ON state by a control signal from the control circuit 9. At this time, there is formed a negative feedback loop from the output terminal 23 of the amplifier 20 to its input terminal 22 via the resistor 31 and the switch 30. Then, a voltage induced by a dark current of the photo detector 11 in the resistor 13 and an offset voltage of the amplifier 14 itself are amplified by the amplifier 14 to device at its output 17 the amplified output voltage, which is applied to the input terminal 21 of the amplifier 20. The voltage applied to the input terminal 21 is amplified by the amplifier 20 together with its offset voltage, but the voltage appearing at the output terminal 23 of the amplifier 20 is negatively fed back to the input terminal 22 of the amplifier 20 via the resistor 31 and the switch 30. The negative feedback voltage to the input terminal 22 of the amplifier 20 is equal to the sum of the voltage supplied to the other input terminal 21 of the amplifier 20 and its offset voltage; if the gain of the amplifier 20 is sufficiently large, then substantially no output is provided at the output terminal 23 of the amplifier 20. That is, it is possible to eliminate a drift which results from fluctuations of the dark current of the photo detector and the offset voltages of the amplifiers 14 and 20.

Also while the switch 30 is in the OFF state, a signal with no drift is available at the output terminal 24 since the capacitor 32 has stored therein a voltage cancelling the drift.

Figure 3:
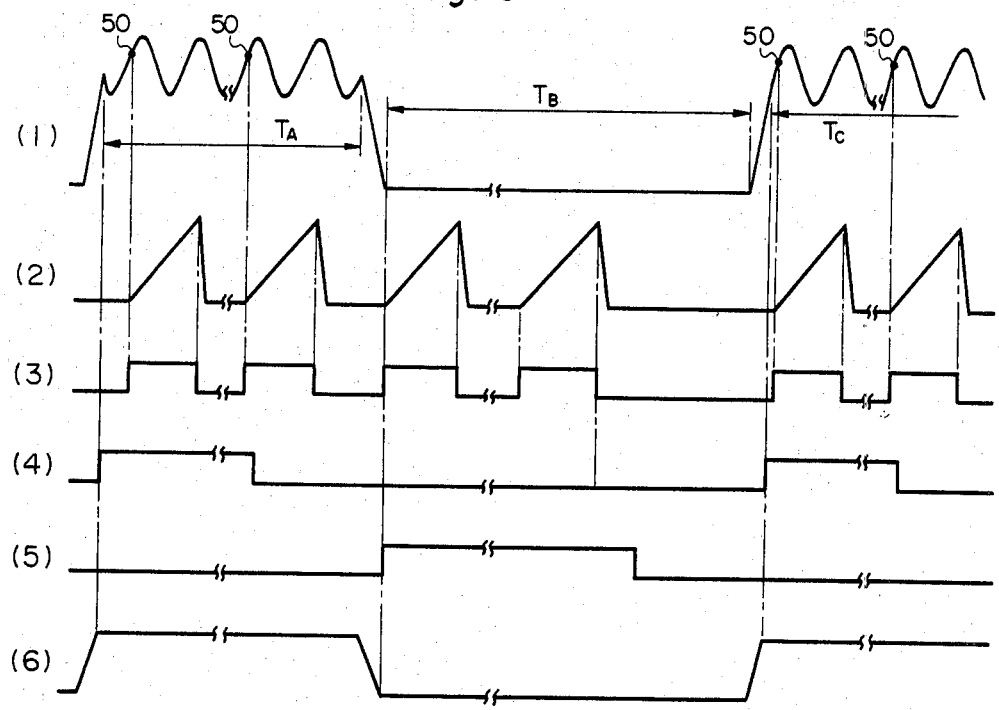
FIGS. 3 and 4 show waveforms appearing at various parts of the device of this invention.

FIG. 3 shows waveform diagrams explanatory of the operation of the device according to this invention.

At the output terminal 24 in FIG. 2 is available a waveform (1) such, for example, as shown in FIG. 3. In periods $T_A$ and $T_C$ during which light passes through the rotary disc 4, there are obtained waveforms (1) of the periods indicated by $T_A$ and $T_C$ in FIG. 3. In a period $T_B$ during which the light is intercepted by the rotary disc 4, there is provided a waveform (1) of the period indicated by $T_B$ in FIG. 3, that is, 0 level.

To the time base circuit 44 are supplied one portion of the output from the amplifier unit 10 and one portion of the output from the control circuit 9. The output from the photo diode 8 assumes such a waveform (6) as shown in FIG. 3, and the output from the control circuit 9 assumes such waveforms (5), (4) as depicted in FIG. 3. The waveform (5) of FIG. 3 is applied from the control circuit 9 to the switch 30 of the amplifier unit 10 and the time base circuit 44, whereas the waveform (4) of FIG. 3 is applied to the time base circuit 44 from the control circuit 9. In the waveform (5) depicted in FIG. 3, the period of a level H (a high voltage level) is set to be shorter than the period $T_B$, and while the waveform (5) of FIG. 3 is at the level H, the switch 30 is in the ON state. The period of the level H of the waveform (4) of FIG. 3 is set to be shorter than the period $T_A$.

To the time base circuit 44 are applied the waveforms (1), (4) and (5) shown in FIG. 3, and when the waveform (4) of FIG. 3 assumes the level H, the time base circuit 44 is operable in response to a signal. Namely, at a point 50 of a predetermined level of a positive slope of a signal waveform the time base circuit 44 starts to operate and shifts from a level L (a low level) to the level H, as shown by a waveform (3) in FIG. 3, and generates a sawtooth waveform (2) depicted in FIG. 3 in the period of the level H. When this sawtooth waveform (2) reaches a certain level, the state of the waveform (3) shown in FIG. 3 is reversed to the level L while the sawtooth waveform (2) of FIG. 3 is also terminated. Then, the time base circuit 44 starts at the point 50 of the predetermined level in the positive slope of the signal waveform (1) after a predetermined hold-off period, and the state of the waveform (3) is reversed from the level L to the level H, as shown in FIG. 3. Therefore the abovesaid operations are repeated. When the waveform (4) of FIG. 3 becomes to have the level L, the waveform (3) of FIG. 3 cannot rise up to the level H irrespective of the level of the signal waveform (1), so that the sawtooth waveform (2) of FIG. 3 cannot be generated. However, when the waveform (5) of FIG. 3 rises up to the level H, the waveform (3) of FIG. 3 rises up to the level H again, generating the sawtooth waveform (2) of FIG. 3. When the level of the sawtooth waveform (2) of FIG. 3 reaches a certain level, the state of the waveform (3) of FIG. 3 is reversed to the level L, with the result that the sawtooth waveform (2) is also terminated. After a predetermined hold-off period the abovesaid operations are repeated to generate the sawtooth waveform (2). When the state of the waveform (5) of FIG. 3 changes to the level L, the state of the waveform (3) of FIG. 3 cannot be changed to the level H so that the sawtooth waveform (2) of FIG. 3 is not generated either. However, when the waveform (4) of FIG. 3 rises up to the level H, the above operations are carried out again.

Figure 4:
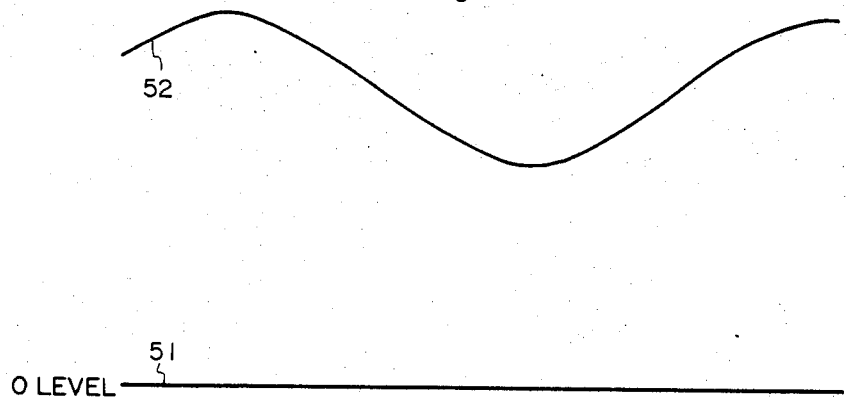

The output waveform (1) of the amplifier unit 10, shown in FIG. 3, is applied via the Y-axis deflection circuit 41 to the Y-axis of the CRT 40. The output waveform (2) of the time base circuit 44, depicted in FIG. 3, is applied via the X-axis deflection circuit 42 to the X-axis of the CRT 40. The waveform (3) illustrated in FIG. 3 is also derived from the time base circuit 44 and provided via the Z-axis modulator 43 to the Z-axis of the CRT 40 to produce a trace at the level H, but no trace is produced at the level L. As a consequence, waveforms 51, 52 such as shown in FIG. 4 is provided on the screen of the CRT 40. Reference numeral 51 indicates a trace representing the 0 level and 52 a trace representing a signal waveform.

The slope of the sawtooth waveform (2) of FIG. 3 in the period $T_B$ may differ from the slope of the sawtooth waveform (2) in the period $T_A$. Moreover, the sawtooth wave (2) of FIG. 3 may be replaced by a staircase wave. In this case, the trace in FIG. 4 becomes a dotted line. The numbers of sawtooth waveforms included in the periods $T_A$ and $T_B$ can be selected as desired. In FIG. 3, if a transition period from the period $T_A$ to the period $T_B$ or from the period $T_B$ to the period $T_C$ has a duration longer than that of one pulse of the pulse train (3) in FIG. 3, the sawtooth wave may be generated at the transition period. In this case, the space between the traces 51 and 52 will also brightened.

In FIG. 1, light is introduced using the fiber 1, but light propagated in the space may also be introduced. Further, the shape of the holes 5 on the rotary disc 4 can freely be modified in accordance with the time for intercepting or passing the light. The light may also be passed at almost all times and intercepted for a very short period of time; in this case, the holes 5 will be formed to extend in the circumferential direction of the rotary disc 4. It is also possible to perform the passage and interception of light through utilization of a light modulator using ultrasonic waves in place of the rotary disc 4. In such a case, since the timing for interception can be synchronized with the light signal, the luminescent diode 7 and the photo diode 8 are unnecessary; hence the control circuit 9 and the time base circuit 44 can be formed with simpler circuits.

Figure 5:
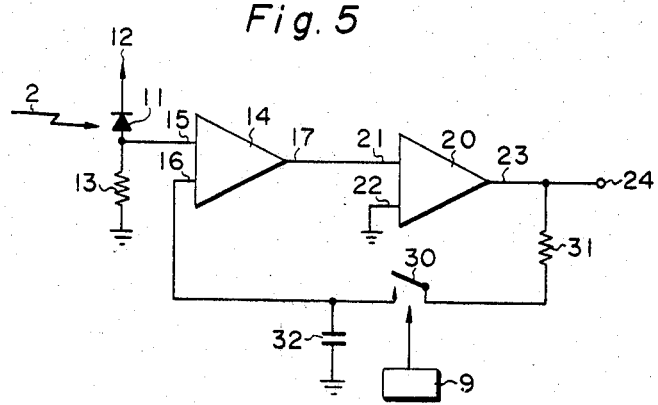
FIGS. 5 to 10 are circuit diagrams illustrating other examples of the photo detector and the amplifier unit employed in the device of this invention.

In FIG. 2, it is also possible to insert an attenuator or amplifier in a negative feedback path from the output terminal 23 of the amplifier 20 to its input terminal 22 via the resistor 31 and the switch 30. The circuit part depicted in FIG. 2 may also be modified as shown in FIG. 5, in which like reference numerals are used for the same elements as those in FIG. 2. The circuit arrangement of FIG. 5 differs from that of FIG. 2 in that the negative feedback path is connected not to the amplifier 20 but to the input terminal 16 of the amplifier 14. Moreover, the amplifier 14 in FIG. 2 is stable with respect to polarity inversion of its input and output or a large variation in its gain or switching of the gain, whereas in FIG. 5 it is impossible to effect polarity inversion of the input and output of the amplifier 14 alone. The reason is that unless the polarities of the input and output of the amplifier 20 are also changed over simultaneously with switching of the input and output polarities of the amplifier 14, the feedback path becomes a positive one to cause oscillation, and oscillation will be also generated if the gain of the amplifier 14 is greatly changed.

Figure 6:
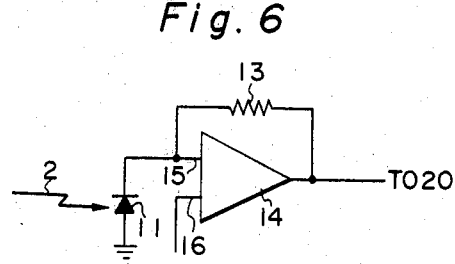

It is also possible to substitute, by a circuit of FIG. 6, the parts including the photo detector 11, the resistor 13 and the amplifier 14 in FIGS. 2 and 5. The anode side of the photo detector 11 in FIG. 6 may also be connected to a bias source instead of being grounded.

Figure 7:
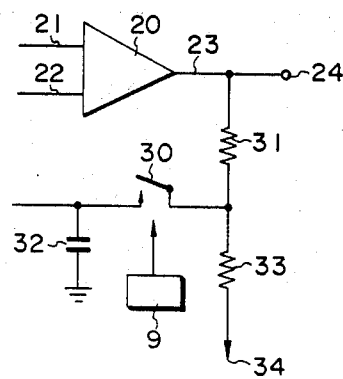

Further, in FIGS. 2 and 5 the negative feedback path may also be arranged as shown in FIG. 7. In FIG. 7, reference numeral 33 indicates a resistor and 34 a power supply whose voltage is adjustable. By adjusting the voltage of the power supply 34, the value of the 0 level of the waveform (1) shown in FIG. 3 can be varied; namely, DC offsetting can be achieved. The power supply 34 whose voltage is adjustable is also available through a potentiometer connected to a fixed voltage source.

The resistor 33 and the power supply 34 whose voltage is adjustable may also be substituted by a constant current circuit whose current value is adjustable. Moreover, in FIG. 2 it is also possible to exchange the photo detector 11 and the resistor 13 by each other and apply a proper bias to the input terminal 16 of the amplifier 14.

Figure 8:
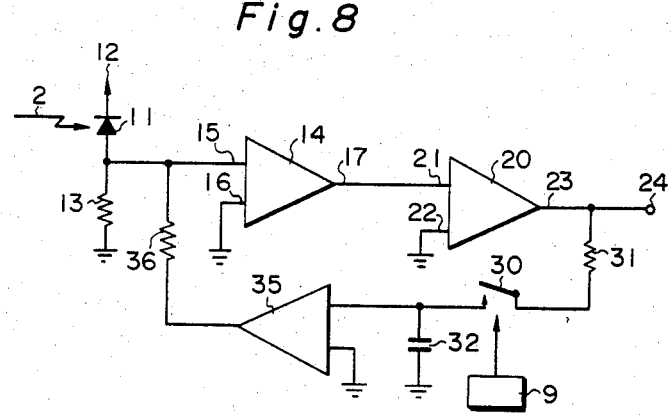

Further, use can also be made of such a circuit arrangement as shown in FIG. 8, in which no description will be repeated with respect to the same elements as those in FIG. 2. Reference numeral 35 indicates a buffer amplifier and 36 a resistor. The buffer amplifier 35 may be one which performs as either a voltage source or a current source.

If a differential amplifier of a large gain and of a small drift is employed as the amplifier 35, then its comparison operation will further enhance the drift eliminating effect. Moreover, although one of two input terminals of the amplifier 35 in FIG. 8 is grounded, DC offsetting can be effected by applying a variable voltage to this input terminal.

The simplest structure for the amplifier 35 may also be the source follower, for example. The circuit of FIG. 8 may also be combined with the circuits of FIGS. 6 and 7. The negative feedback in FIG. 8 may also be applied to one terminal of the resistor 13, as shown in FIG. 9.

Figure 9:
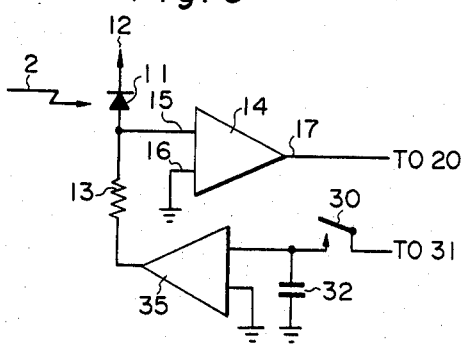
Figure 10:
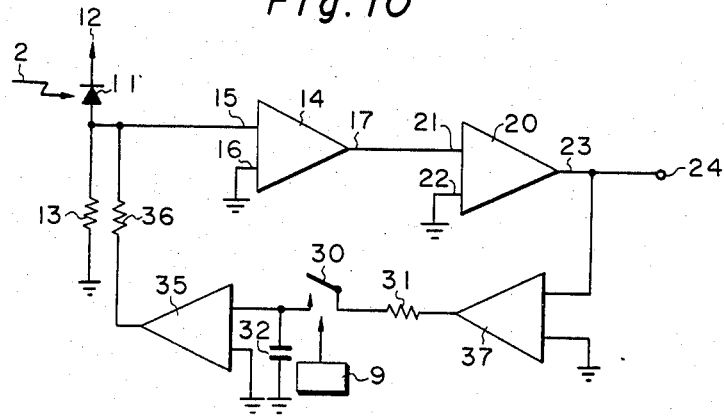

The circuits of FIGS. 8 and 9 may also be replaced by such a circuit as shown in FIG. 10. Reference numeral 37 indicates an amplifier, which is connected between the output terminal 23 of the amplifier 20 and the switch 30. If a differential amplifier of a large gain and of a small drift is used as the amplifier 37, its comparison operation will provide for further enhanced drift eliminating effect. One input terminal of the amplifier 37 is grounded, and by applying a variable voltage to the terminal DC offsetting can be achieved.

In FIGS. 2 and 5, if a differential amplifier of a large gain and of a small drift is inserted in the feedback circuit, as described above in respect of FIGS. 8 and 10,
then the drift eliminating effect will be further improved.

Further, when the light signal is in a pulse-like form in the embodiment shown in FIG. 1, it is desirable to start an observation of the light signal from the rising instant of its waveform; in such cases, a delay cable or a like signal delay cicuit may also be provided in the Y-axis deflection circuit 41.

In FIG. 2, when drifts of the amplifiers 14 and 20 are substantially negligible, the negative feedback path (31, 30, 32) may be omitted. The same is true of FIGS. 5 to 10.

Figure 11:
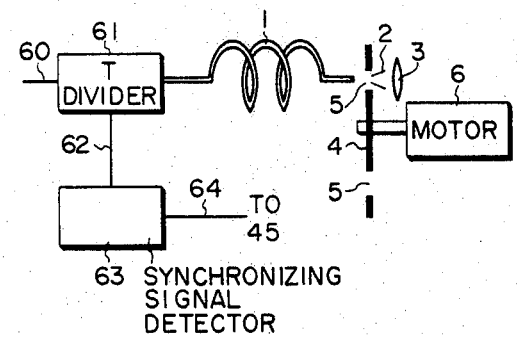
FIG. 11 is a schematic diagram illustrating a modified form of a light signal input part employed in the device of this invention.

FIG. 3 illustrates an example in which the sawtooth waveform (2) is derived from the waveform (1) of FIG. 3(a), but it is also possible to adopt such a light signal input part as illustrated in FIG. 11. Reference numerals 60 and 62 indicate optical fibers; 61 designates a T-divider for dividing light into two; 63 identifies a synchronizing signal detector, which comprises a photo detector and a wide-band amplifier; and 64 denotes a synchronizing signal output terminal, which is connected to the input terminal 45 of the time base circuit 44. The other elements 1, 2, 3, 4, 5 and 6 are identical with those employed in FIG. 1 and hence will not be described. The optical fiber 1 has an appropriate length (of 10 to 50 m, for example,) for sufficiently delaying the optical signal. Even if the optical signal is delayed by this long fiber 1, there is substantially no loss in information of the light 2 available from the terminating end of the fiber 1 by virture of the wide-band and the low-loss property of the fiber 1. By using the fiber 1 of such an appropriate length it is possible to observe the optical signal from the moment of rising of its signal waveform. In this case, light propagated in the space may also be introduced in place of using the fiber 60. The photo detector used in the synchronizing signal detector 63 need not be of excellent linearity, and for this photo detector, a high-sensitivity and high-speed one is suitable.

As will be understood from the foregoing description, it is possible with the present invention to amplify a light signal, under a condition where a drift resulting from a dark current of a photo detector being eliminated, and at the same time, to observe an accurate 0 level; therefore, the invention is of great utility, in particular, when the light signal has a low level. Further, assuming that the drift caused by the dark current of the photo detector remains constant over the time interval between interception of light to the photo detector and the next interception, this drift can be removed; accordingly, the time interval between the interceptions of light can be expanded appreciably long, and if the time interval is reduced, a drift in a short time can also be eliminated.

Figure 12:
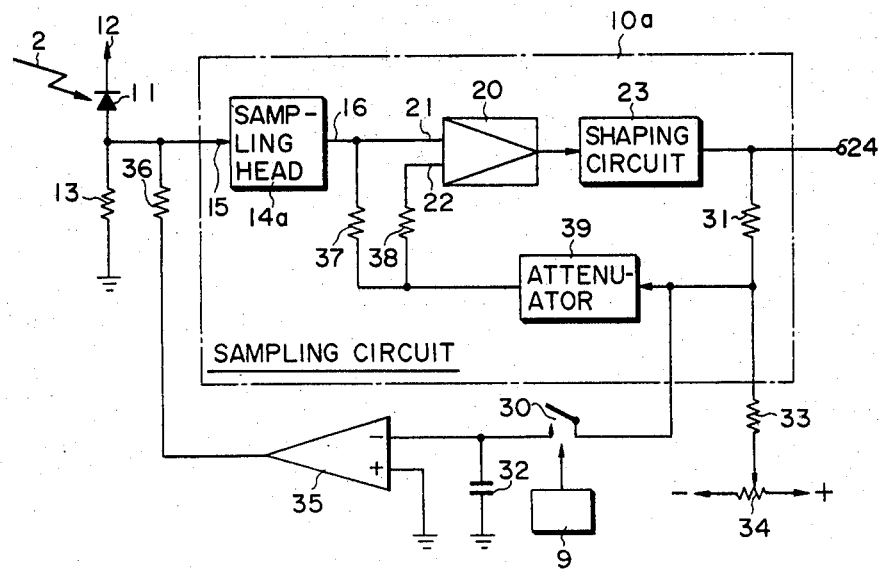
FIG. 12 is a circuit diagram showing by way of example, a photo detector and an amplifier unit of sampling circuit employed in the device of this invention.

Another example of a circuit arrangement constructed as a sampling oscilloscope in which the output from the photo detector 11 is outputted via the amplifier unit 10a of sampling circuit is shown in FIG. 12 and its operation will be described in detail.

In FIG. 12, the same parts as those in FIG. 1 are identified by the same reference numerals; therefore, no description will be given of them. Reference numeral 12 indicates a bias source for the photo detector 11; 13, 31, 33, 37 and 38 designate resistors; 14a identifies a sampling head; 15 and 16 denote input and output terminals of the sampling head 14a respectively; 20 represents an AC amplifier including a differential amplifier; 21 and 22 show input terminals of the AC amplifier 20; 23 refers to a shaping circuit; 24 indicates an output terminal of the amplifier unit 10a; 34 designates a potentiometer, which is connected at the two terminals to positive and negative power sources; 30 identifies a switch; 32 denotes a capacitor; 35 denotes a buffer amplifier; and 39 represents an attenuator.

In the above, the sampling head 14a, the AC amplifier 20, the shaping circuit 23 and the attenuator 39 make up a sampling circuit 10a of a sampling oscilloscope, and this circuit is known (for example, Japanese Patent Publication No. 24866/76) and a wide-band circuit suitable for observing high-frequency signals. No detailed description will be given of this sampling circuit.

When no light is incident to the photo detector 11, the switch 30 is held in the ON state by a control signal from the control circuit 9. At this time, there is formed a negative feedback path from the output terminal 24 to the input terminal 15 of the sampling head 14a via the resistor 31, the switch 30, the buffer amplifier 35 and the resistor 36. A waveform appearing at the output terminal 24 is a low-frequency waveform that a waveform applied to the input terminal 15 of the sampling head 14a is approximated in a staircase manner, and the both waveforms are in-phase in polarity. A voltage induced by a dark current of the photo detector 11 in the resistor 13 (If the value of the resistor 36 is sufficiently larger than that of the resistor 13, the dark current flowing in the resistor 36 is negligible.) and an offset voltage of the sampling circuit, that is, the sampling head 14a, the AC amplifier 20 and the shaping circuit 23, are amplified and derived at the output terminal 24. Now, for convenience of description, let it be assumed that the resistor 33 is not provided. The voltage appearing at the output terminal 24 is applied to the resistor 31, the switch 30 and the buffer amplifier 35. The buffer amplifier 35 is adapted to serve as a differential amplifier, and the voltage applied thereto is reversed and amplified thereby and then negatively fed back to the input terminal 15 of the sampling head 14a via the resistor 36. As a result of this feedback, substantially no output appears at the output terminal 24. In other words, it is possible to eliminate a drift which is caused by variations of the dark current of the photo diode 11 and the offset voltage of the sampling circuit 10a. If a differential amplifier of a large gain and of a small drift is used as the amplifier 35, the drift eliminating effect is further enhanced by its comparison operation. Further, although one of the input terminals of the amplifier 35 is grounded in FIG. 12, but if a variable voltage is applied to this input terminal, DC offsetting can be achieved. Also while the switch 30 is in the OFF state, a signal with no drift is obtained at the output terminal 24 since a voltage cancelling the drift is stored in the capacitor 32.

Next, the resistor 33 and the potentiometer 34 will be described. A current flowing from the potentiometer 34 via the resistor 33 is applied to the resistor 31 to produce an offset voltage at the output terminal 24.

Figure 13:
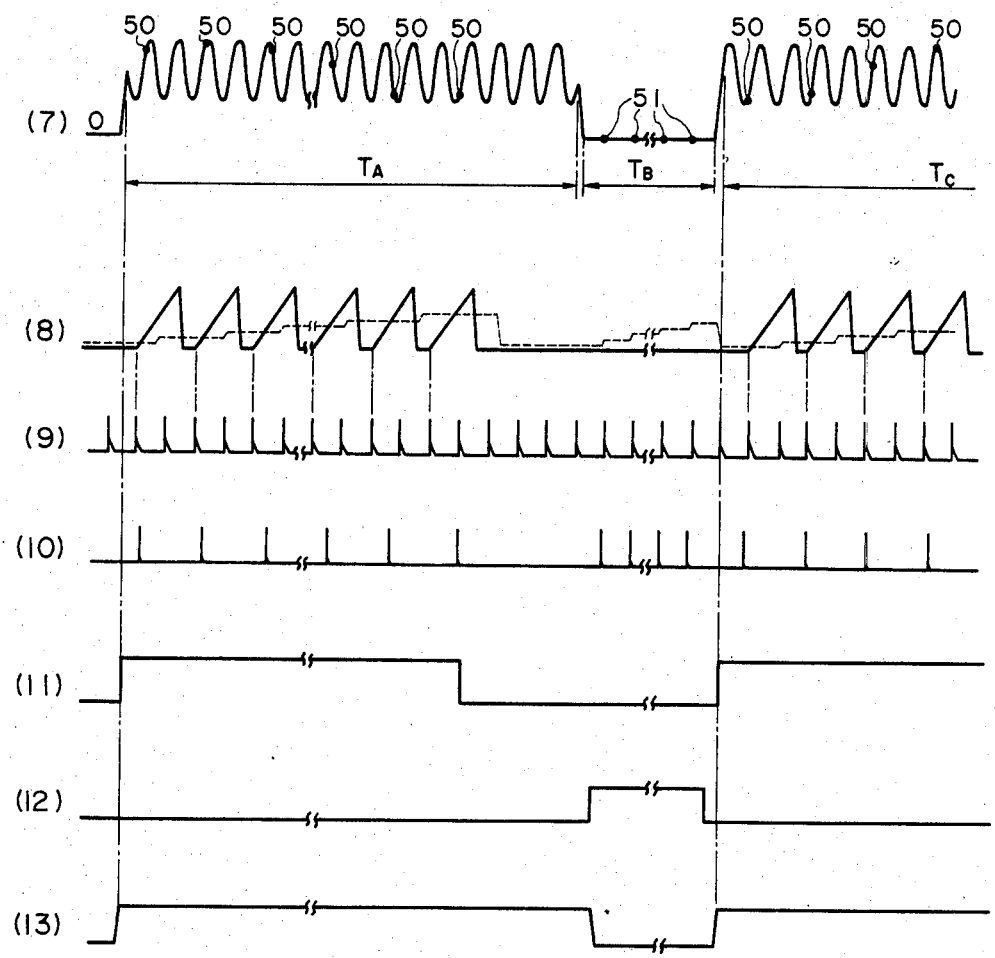
FIGS. 13 and 14 show waveforms appearing at various parts of the device of this invention.

FIG. 13 shows waveforms appearing at various parts of the device of this invention, explanatory of its operation.

Across the resistor 13 in FIG. 12 is obtained such a waveform (7) as shown in FIG. 13. In periods $T_A$ and $T_B$ during which light passes through the rotary disc 4, there are obtained a waveform (7) of the periods indicated by $T_A$ and $T_C$ in FIG. 13. In a period $T_B$ during which the light is intercepted by the rotary disc 4, there is provided a waveform (7) of the period indicated by $T_B$ in FIG. 3, that is, the zero level.

To the time base circuit 44 is supplied from its synchronizing signal input terminal 45 such a synchronizing signal (9) as depicted in FIG. 13 which is synchronized with a light signal. An output waveform (13) of the photo diode 8 is such as illustrated in FIG. 3, and an output waveforms (11) and (10) of the control circuit 9 are such as shown in FIG. 13. A waveform (12) of FIG. 13 is applied from the control circuit 9 to the switch 30 of the amplifier unit 10a and the time base circuit 44, and the waveform (11) of FIG. 13 is supplied from the control circuit 9 to the time base circuit 44. In the waveform (12) of FIG. 13, the period of its level H (a high voltage level) is set to be shorter than the period $T_B$, and while the waveform (12) of FIG. 13 assumes the level H, the switch 30 is in the ON state. The level H of the waveform (11) of FIG. 13 is set to be shorter than the period $T_A$.

To the time base circuit 44 are applied the waveforms (9), (11) and (12) of FIG. 13 and when the waveform (11) of FIG. 13 assumes the level H, the time base circuit 44 becomes operable in response to the synchronizing signal (9) of FIG. 13 and operates in synchronism therewith to generate a sawtooth waveform (8) indicated by the solid line in FIG. 13. The time base circuit 44 includes a circuit for generating a staircase (8) indicated by the broken line in FIG. 13 and compares the levels of the staircase and the sawtooth wave and produces a pulse when they coincide with each other. That is, at the intersections of the sawtooth wave and the staircase shown in FIG. 13, sampling command pulses (10) depicted in FIG. 13 are generated. The command pulses are applied to the shaping circuit 23 of the amplifier unit 10a and, at the same time, rendered into sampling pulses of very small width and also provided to the sampling head 14a to perform the sampling operation. The sampled points are indicated by dots 50 in the waveform (7) of FIG. 13. For each sampling, the stair case advances by one step and the sawtooth waveform is also terminated. After a certain hold-off period the sawtooth waveform (8) of FIG. 13 is produced again in response to the synchronizing pulses (9) of FIG. 13 and the abovesaid operations are repeated.

Thus, a low-frequency waveform, similar to the signal waveform (7) of FIG. 13 which has amplitudes of the points 50 and changes in a staircase manner, is derived at the output terminal 24. When the waveform (11) of FIG. 13 assumes a level L (a low voltage level), no sawtooth waveform is produced irrespective of the application of the synchronizing pulses, and the stair case (8) is reset.

In the period $T_B$, when the waveform (12) of FIG. 13 rises up to the level H, the sampling command pulses (10) of FIG. 13 are generated to sample the 0 level, as indicated by the dots 50 in the waveform (7) of FIG. 13. As a result of this, the 0 level is outputted at the output terminal 24 of the amplifier unit 10a, thereby causing the staircase (8) of FIG. 13 to advance. When the waveform (12) of FIG. 13 lowers to the level L, the staircase is reset. In the period from this resetting instant to the generation of the staircase, the time base circuit 44 sends out a brightness signal (not shown), which is applied via the Z-axis modulator 43 to the Z-axis of the CRT 40 to prevent generation of a trace.

When the waveform (11) of FIG. 13 rises up to the level H again, the abovesaid operations are repeated.

Figure 14:
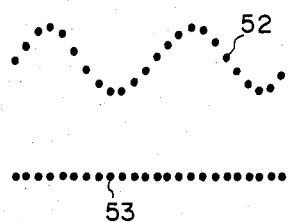

The staircase (8) indicated by the broken line in FIG. 13 is derived from the time base circuit 44 and applied via the X-axis deflection circuit 42 to the X-axis of the CRT 40. A staircase-like waveform having the levels of the many points 50 and points 51, shown in the waveform (7) of FIG. 13, is outputted from the amplifier unit 10a and applied via the Y-axis deflection circuit 41 to the Y-axis of the CRT 40. In a period other than the period of resetting the staircase and the period of no staircase being generated, a pulse waveform, not shown, is generated by the time base circuit 44 and provided via the Z-axis modulator 43 to the Z-axis of the CRT 40 for intensity modulation. As a consequence, there are produced on the screen of the CRT 40 waveforms represented by bright spots 52 and 53 respectively corresponding to the points 50 and 51 in the waveform (7) of FIG. 13, as shown in FIG. 14. As staircase of dotted line shown in the wave (8) of FIG. 14 may be replaced by a sawtooth wave of gentle spole as employed in conventional sampling oscilloscope. Moreover, the staircase in the period $T_B$ may be replaced by a staircase which has a down-slope from the last peak value of the staircase in the period $T_A$.

In the example (8) of FIG. 13, no sawtooth signal is generated while the waveform (12) of FIG. 13 is at the level H in the period $T_B$; but, also while the waveform (12) of FIG. 13 is at the level H, it is possible to generate the sampling command pulses (10) by producing the sawtooth waveform and comparing it with the staircase.

In FIG. 13 the description has been given of the case where use is made of external synchronizing pulses synchronized with the light signal; however, it is also possible to provide the synchronizing pulses by obtaining the waveform (7) of the light signal of FIG. 13(a) across the resistor 13 in FIG. 12 and amplifying it by a wide-band amplifier.

Figure 15:
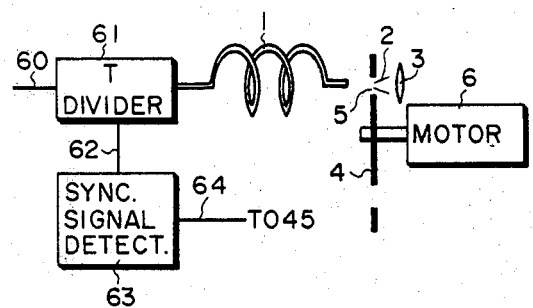
FIG. 15 is a circuit diagram showing a modified form of an optical signal input part in this invention.

Further, it is also possible to adopt such a light signal input part as depicted in FIG. 15. Reference numerals 60 and 62 indicate optical fibers; 61 designates a T-divider for dividing the light into two; 63 identifies a synchronizing signal detector, which comprises a photo detector and a wideband amplifier; and 64 denotes a synchronizing signal output terminal, which is connected with the input terminal 45 of the time base circuit 44. The other elements 1, 2, 3, 4, 5 and 6 are identical with those utilized in FIG. 1 and hence will not be described. The fiber 1 has an appropriate length (of 10 to 50 m, for example,) for sufficiently delaying the light signal. Even if the light signal is delayed by this long fiber 1, there is substantially no loss in information of the light 2 available from the terminating end of the fiber 1 by virtue of the wideband and the low-loss property of the fiber 1. By using the fiber 1 of such an appropriate length it is possible to observe the light signal from the moment of rising of its signal waveform. In this case, light propagated in the space may also be introduced in place of using the fiber 60. The photo detector used in the synchronizing signal detector 63 need not be of excellent linearity, and for this photo detector, a high-sensitivity and high-speed one is suitable.

Figure 16:
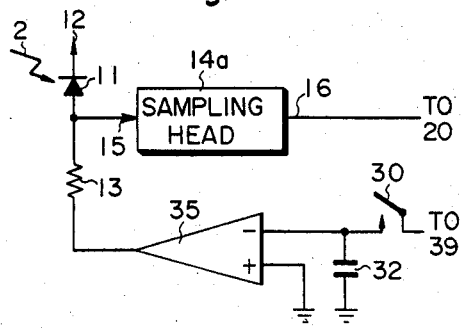
FIGS. 16, 17 and 18 are circuit diagrams illustrating other examples of photo detector and the amplifier unit employed in the device of this invention.
Figure 17:
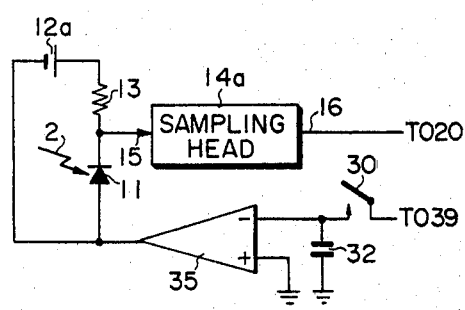

The part shown in FIG. 12 may also be modified as shown in FIGS. 16 and 17, in which like reference numerals are used for the same elements as those in FIG. 12. In FIG. 17, reference numeral 12a indicates a bias source, but its one terminal is not grounded.

In FIG. 12, one terminal of the resistor 36 may be connected to the output 16 of the sampling head 14a after disconnecting from the input 15. In this case, the input polarities of the buffer amplifier 35 are also changed by each other, so that the input from the switch 30 is connected to the plus terminal of the buffer amplifier 35 while the minus terminal of the buffer amplifier 35 is grounded.

In FIG. 12, it is also possible to substitute the resistor 33 and the potentiometer 34 with a constant current source whose current value is adjustable, thereby to provide a DC offset voltage (for changing the value of the 0 level of the waveform (7) shown in FIG. 3 at the output terminal 24.

Figure 18:
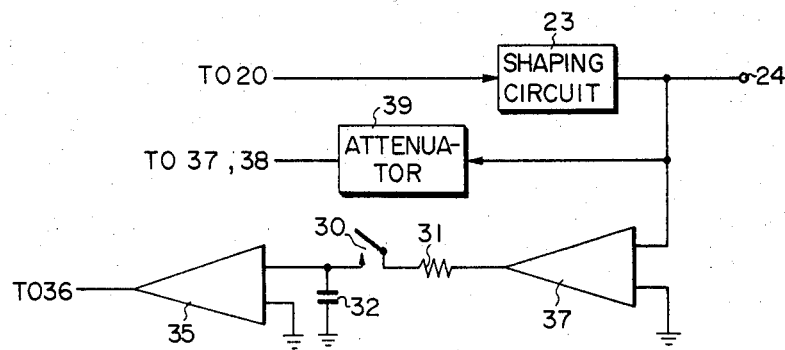

Further, embodiments shown in FIGS. 16 and 17 can be modified to a circuit arrangement as shown in FIG. 18, in which reference numeral 37 indicates an amplifier connected between the putput terminal 24 of the sampling circuit 10a and the switch 30. If a differential amplifier of a large gain and of a small drift is employed as the amplifier 37, its comparison operation will further enhance the drift eliminating effect. One of two input terminals of the amplifier 37 is grounded, but DC offsetting can be effected by applying a variable voltage to this terminal.

In a case where the light signal is in a pulse-like from in the embodiment shown in FIG. 1, if it is desired to observe the light signal from rising of its waveform, then it is also possible to interconnect the photo detector 11 and the amplifier unit 10 with a coaxial cable of a suitable length (10 to 50 m) to thereby delay the signal.

In FIG. 12, when the drift of the sampling circuit including the sampling head 14a and so forth is negligible, the switch 30, the capacitor 32, the buffer amplifier 35 and the resistor 36 may also be left out.

Figure 19:
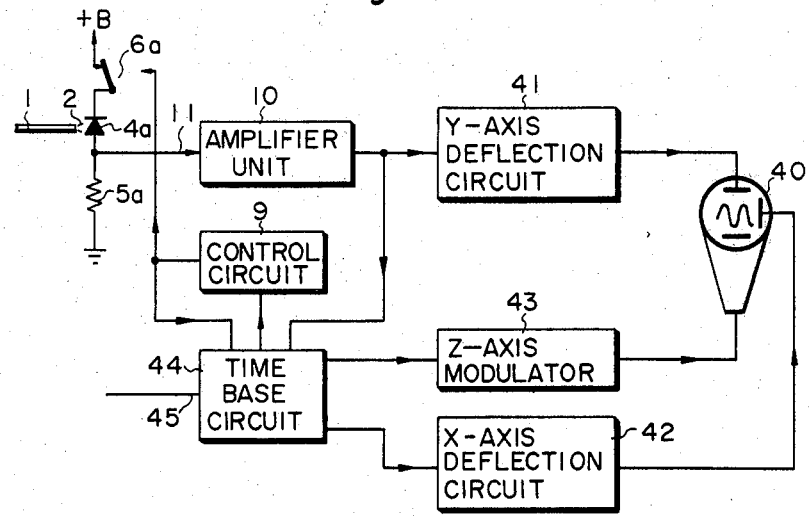
FIG. 19 is a block diagram showing of this invention.

With reference to FIG. 19 showing another embodiment of this invention constructed as a synchroscope, reference numeral 1 indicates an optical fiber having a diameter of about 100 μm for guiding a light signal; 2 designates a light emanating from the fiber 1; 4a identifies a photo detector, such as a PIN photo diode, an avalanche photo diode (APD) or the like; 5a denotes a resistor for converting an output current from one terminal of the photo detector 4a into a voltage; 6a represents a switch (a light receiving switch), through which the other end of the photo detector 4a is connected to a bias source +B; 9 shows a control circuit; 10 refers to an amplifier unit; 11a indicates an input terminal of the amplifier unit 10; 40 designates a CRT for displaying a waveform; 41 and 42 identify deflection circuits for performing the Y-axis and the X-axis deflection of the CRT 40; 43 denotes a Z-axis modulator for applying a signal to the Z-axis of the CRT 40 for intensity modulation; and 44 represents a time base circuit.

When the switch 6a is in the ON state, the photo detector 4a (for example, a PIN photo diode) flows a current due to the light 2, producing a voltage across the resistor 5a. This voltage is applied to the input terminal 11a of the amplifier unit 10 and amplified, thereafter being supplied via the Y-axis deflection circuit 41 to the Y-axis of the CRT 40. In other words, a light signal is converted into an electrical signal and applied to the Y-axis of the CRT 40. When the switch 6a is in the OFF state, no voltage is generated across the resistor 5a, since the photo detector 4a does not flow a current even if it receives the light 2. Accordingly, the input voltage at the input terminal 11a of the amplifier unit 10 is zero, and the voltage of the Y-axis of the CRT 40 is also at the 0 level (or at a DC offset voltage, if it is applied by the amplifier 10 or the Y-axis deflection circuit 41). This will be described with reference to waveform diagrams of FIG. 3. FIG. 3 also shows an example of a waveform (1) appearing at the input terminal 11 of the amplifier 10. The switch 6a is in the ON state in a period $T_A$ but in the OFF state in a period $T_B$.

To the time base circuit 44 are applied one portion of the output from the control circuit 9. The output waveform from the control circuit 9, which is applied for controlling the switch 6a, is such (6) as shown in FIG. 3, and the waveform (6) of FIG. 3 assumes a level H (a high voltage level) in the period $T_A$, during which the waveform (1) of FIG. 3 is provided to the input terminal 11a. In the period $T_B$, the waveform (6) of FIG. 3 which is derived from the control circuit 9 and applied to the switch 6a is at a level L (a low voltage level), and in this period no signal is provided to the input terminal 11a, so that the voltage level at this terminal is zero. The output from the control circuit 9 is supplied to the switch 6a and, at the same time, to the time base circuit 44.

The time base circuit 44 derives waveforms (4) and (5) of FIG. 2 from the waveform (6) of FIG. 3. The state of the waveform (4) of FIG. 3 is changed from the level L to the level H when the waveform (6) of FIG. 3 reaches the level H. When the waveform (4) of FIG. 3 reaches the level H, the time base circuit 44 supplied with one portion of the output signal from the amplifier unit 10 becomes operable in response to the signal and operates at a point 50 at a predetermined level on a positive slope of the signal waveform (1) and changes from the level L to the level H to generate a sawtooth waveform (8) shown in FIG. 3. When the instantaneous level of the sawtooth waveform (8)' reaches a certain level, the state of the waveform (3) of FIG. 3 reverses to the level L, and the sawtooth signal is also terminated. After a predetermined hold-off period, the time base circuit 44 operates at the point 50 of a predetermined level on the positive slope of the signal waveform (1) and changes from the level L to the level H, as shown in the waveform (3) of FIG. 3, generating the sawtooth wave (2) of FIG. 3. Thereafter, the abovesaid operations are repeated for a predetermined suitable period of time. Then, the state of the waveform (4) of FIG. 3 is changed to the level L from the level H. When the waveform (4) of FIG. 3 reaches the level L, a signal, not shown in FIG. 3, is derived from the time base circuit 44 and applied to the control circuit 9, and after a suitable period of time, the control circuit 9 changes from the level H to the level L to provide the waveform (6) of FIG. 3. When the output waveform (6) of FIG. 3 derived from the control circuit 9 lowers to the level L, the switch 6 which is supplied with the output from the control circuit 9 is turned OFF, so that the waveform (1) at the input terminal 11a, shown in FIG. 3, lowers to the 0 level. On the other hand, the output from the control circuit 9 is also applied to the time base circuit 44, and this time base circuit 44 generates a waveform (5) of FIG. 3 (changes from the level L to the level H) in response to the change of the waveform (6) of FIG. 3 from the level H to the level L.

When the waveform (5) of FIG. 3 assumes the level H, the waveform (3) of FIG. 3 also rises up to the level H, producing the sawtooth waveform (2) shown in FIG. 3. When the sawtooth waveform (2) of FIG. 3 reaches a certain level, the waveform (3) of FIG. 3 changes to the level L and the sawtooth wave is also terminated. Other a predetermined hold-off period, the state of the waveform (3) of FIG. 3 is changed from the level L to the level H and the abovesaid operations are repeated to provide a sawtooth waveform. After the sawtooth waveforms are repeatedly generated for a predetermined period of time, the state of the waveform (5) of FIG. 3 changes from the level H to the level L. Then, the waveform (3) of FIG. 3 cannot be changed to the level H and the sawtooth waveform (2) of FIG. 3 is not generated, either. Upon reversal of the state of the waveform (5) of FIG. 3 from the level H to the level L, the time base circuit 44 provides a signal, not shown, which signal is applied to the control circuit 9. After a certain period of time from the application of this signal, the control circuit 9 starts its operation and the state of the waveform (6) of FIG. 3 rises up to the level H from the level L. Thereafter, the abovesaid operations are repeated.

The output waveform (1) of the amplifier unit 10, shown in FIG. 3, is applied via the Y-axis deflection circuit 41 to the Y-axis of the CRT 40. The output waveform (2) of the time base circuit 44, depicted in FIG. 3, is applied via the X-axis deflection circuit 42 to the X-axis of the CRT 40. The waveform (3) shown in FIG. 3 is also derived from the time base circuit 44 and applied via the Z-axis modulator 43 to the Z-axis of the CRT 40 to produce a trace at the level H, but no trace is yielded at the level L. As a consequence, such waveforms as shown in FIG. 4 are displayed on the screen of the CRT 40. Reference numeral 51 indicates a trace representing the 0 level and 52 a trace representing the signal waveform.

The slope of the sawtooth waveform (2) of FIG. 3 in the period $T_B$ may differ from the slope of the sawtooth waveform in the period $T_A$. The numbers of sawtooth waveforms included in the periods $T_A$ and $T_B$ can be selected as desired.

Figure 21A:
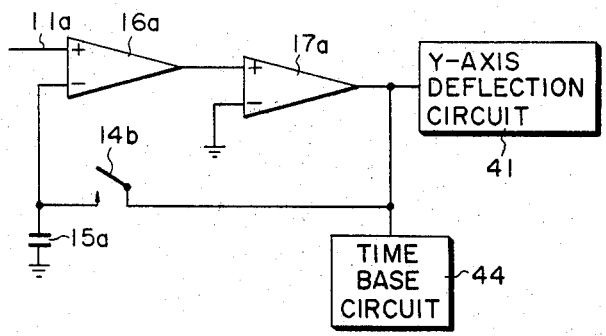
FIGS. 21A and 21B are circuit diagrams showing modified forms of an amplifier unit employed in the device of this invention.
Figure 21B:
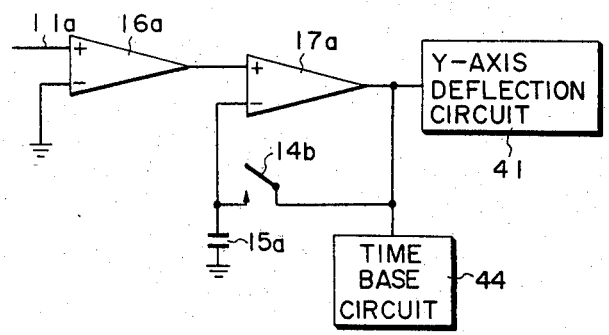

The amplifier unit 10 in FIG. 1 may also have such circuit arrangements as shown in FIGS. 21A and 21B, in which like reference numerals are used to indicate the same parts as those in FIG. 1. Reference numerals 16 and 17 indicate differential amplifiers; 14b designates a switch; and 15a identifies a capacitor. The waveform (5) shown in FIG. 3 is applied to the switch 14b, and if the switch 14b is adapted to be turned ON or OFF at the level H or L of the waveform (5) of FIG. 3, drifts of the differential amplifiers 16a and 17a are decreased by negative feedback while the switch 14b is in the ON state, and while the switch 14b is in the OFF state the feedback voltage is stored in the capacitor 15a, by which the drifts can be reduced during the OFF state of the switch 14b. A difference between the circuit arrangements of FIGS. 21A and 21B is that the feedback signals are fed back to different places. The circuit structure of FIG. 21B is stable with respect to switching of the input and output polarities or a great change in gain or its switching, whereas the circuit of FIG. 21B is unstable and may oscillate in some cases.

In FIG. 21A or 21B, a differential amplifier having a large gain and an input terminal grounded may be inserted in the feedback path from the output of the differential amplifier 17a to the switch 14b, so that the zero level shown in FIG. 4 can be offset.

Figure 22A:
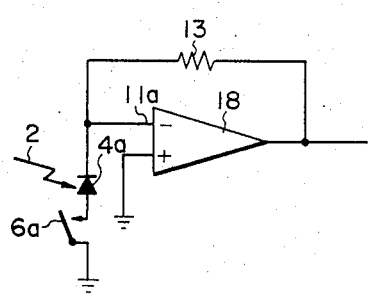
FIGS. 22A and 22B are circuit diagrams illustrating modified forms of light receiving means employed in the device of this invention.
Figure 22B:
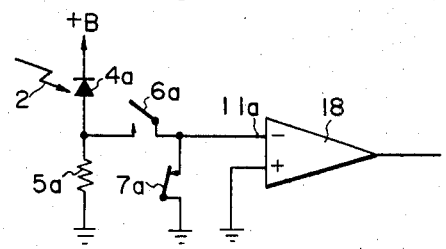

The parts of the photo detector 4a, the switch 6a and the amplifier unit 10 in FIG. 19 may also be arranged as shown in FIGS. 22A and 22B, in which reference numeral 13 indicates a resistor; 18 designates an amplifier; and 7a identifies a switch. In a case of FIG. 22A, the switch 6a may also be connected to the cathode of the photo detector 4a. Further, in a case of FIG. 22B, when the switch 6a is turned ON and OFF, the switch 7a is turned OFF and ON.

In FIG. 19, the switch 6 and the photo detector 4 may be replaced by each other in the connection order.

Figure 20:
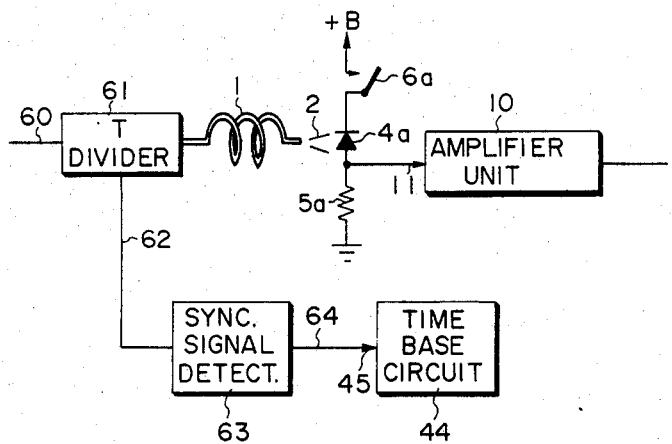
FIG. 20 is a diagram illustrating a modified form of an optical signal input part in this invention.

FIG. 3 illustrates the example in which the sawtooth waveform (2) of FIG. 3 is derived from the waveform (1) of FIG. 3, but it is also possible to adopt such a light signal input part as shown in FIG. 20. Reference numerals 60 and 62 indicate optical fibers; 61 designates a T-divider for dividing light into two; 63 identifies a synchronizing signal detector, which comprises a photo detector and a wide-band amplifier; and 64 denotes a synchronizing signal output terminal, which is connected to the input terminal 45 of the time base circuit 44. The other numerals 2, 4a, 5a, 6a, 10a and 11a are identical with those utilized in FIG. 19 and hence will not be described. The fiber 1 has an appropriate length (of 10 to 50 m, for example,) for sufficiently delaying the optical signal. Even if the optical signal is delayed by this long fiber 1, there is substantially no loss in information of the light 2 available from the terminating end of the fiber 1 by virtue of the wide-band and the low-loss property of the fiber. By using the fiber 1 of such an appropriate length it is possible to observe the optical signal from the moment of rising of its signal waveform. In this case, light propagated in the space may also be introduced in place of using the fiber 60. The photo detector used in the synchronizing signal detector 63 need not be of excellent linearity, and for this photo detector, a high-sensitivity and high-speed one is suitable.

As will be apparent from the foregoing description, according to this invention, in such a case where the dark current of the photo detector is negligible, the optical signal can be amplified and, at the same time, the 0 level can be observed, so that the device of this invention is very useful as an oscilloscope for observing light.

With reference to FIG. 23 showing another embodiment of this invention constructed as a sampling oscilloscope reference numeral 1 indicates an optical fiber having a diameter of about 100 μm for guiding a light signal; 2 designates a light emanating from the fiber 1; 4a identifies a photo detector for converting the light signal into an electrical signal, such as, for example, a PIN photo diode, avalanche photo diode (APD) or the like; 5a denotes a resistor; 6a represents a switch (a high receiving switch), through which the cathode of the photo detector 4a is connected to a bias source +B; 10a refers to an amplifier unit for amplifying the output from the photo detector 11; 40 designates a CRT for displaying a waveform; 41 and 42 identify deflection circuits for performing the Y-axis and the X-axis deflection of the CRT 40; 43 denotes a Z-axis modulator for applying a signal to the Z-axis of the CRT 40 for intensity modulation; 44 represents a time base circuit; 45 shows an input terminal for applying a synchronizing signal to the time base circuit 44; and 9 refers to a control circuit for controlling the switch 6a, the amplifier unit 10a and the time base circuit 44.

An example of the photo detector 4a and the amplifier unit 10a is shown in FIG. 24, and its operation will be described in detail.

In FIG. 24, the same parts as those in FIG. 23 are identified by the same reference numerals; therefore, no description will be given of them.

Reference numerals 31, 33, 36, 37 and 38 designate resistors; 14a identifies a sampling head; 15 and 16 denote input and output terminals of the sampling head 14a respectively; 20 represents an AC amplifier including a differential amplifier; 21 and 22 show input termi- nals of the AC amplifier 20; 23 refers to a shaping circuit; 24 indicates an output terminal of the amplifier unit 10a; 39 designates an attenuator; 34 identifies a potentiometer, which is connected at the two terminals to positive and negative power sources; 30 denotes a switch; 32 represents a capacitor; and 35 shows a buffer amplifier.

In the above, the sampling head 14a, the AC amplifier 20, the shaping circuit 23 and the attenuator 39 make up a sampling circuit 10a of a sampling oscilloscope, and this circuit is known (for example, Japanese Patent Publication No. 24866/76) and a wide-band circuit suitable for observing high-frequency signals. No detailed description will be given of this sampling circuit.

When the switches 6a and 30 are respectively held in the OFF and the ON state by a control signal from the control circuit 9, there is formed a negative feedback path from the output terminal 24 to the input terminal 15 of the sampling head 14a via the resistor 31, the switch 30, the buffer amplifier 35 and the resistor 36. When the switches 6a and 30 are respectively held in the ON and the OFF state by a control signal from the control circuit 9, a waveform appearing at the output terminal 24 is a low-frequency waveform that a waveform applied to the input terminal 15 of the sampling head 14a is approximated in a staircase manner, and the both waveforms are in-phase in polarity.

A deviation in an offset voltage (a drift) of the sampling circuit, that is, the sampling head 14a, the AC amplifier 20 and the shaping circuit 23, is amplified and derived at the output terminal 24. Now, for convenience of description, let it be assumed that the resistor 33 is not provided.

The voltage appearing at the output terminal 24 is applied to the resistor 31, the switch 30 and the buffer amplifier 34. The buffer amplifier 35 is adapted to serve as a differential amplifier, and the voltage applied thereto is compared with the voltage (zero) at its other grounded input terminal, reversed and amplified, thereafter being negatively fed back to the input terminal 15 of the sampling head 14 via the resistor 36 (but, when the switch 6a is OFF and the switch 30 ON). As a result of this feedback, substantially no output (drift) appears at the output terminal 24. In other words, it is possible to eliminate a drift which is caused by variations of the offset voltage of the sampling circuit. If a differential amplifier of a large gain but of a small drift is used as the amplifier 35, the drift eliminating effect is further enhanced by its comparing operation. Further, although one of the input terminals of the amplifier 35 is grounded in FIG. 24, if a variable voltage is applied to this input terminal, DC offsetting can be achieved.

Also, while the switch 30 is in the OFF state, a signal with no drift is obtained at the output terminal 24 since a voltage cancelling the drift is stored in the capacitor 32.

Next, the resistor 33 and the potentiometer 34 will be described. A current flowing from the potentiometer 34 via the resistor 33 is applied to the resistor 31 to produce an offset voltage at the output terminal 24.

FIG. 13 shows a series of waveforms appearing at various parts of the device of this invention, explanatory of its operation.

Across the resistor 5a is available such a waveform (7) as shown in FIG. 13. While the switch 6a is in the ON state, there are obtained waveforms of the periods indicated by $T_A$ and $T_C$. While the switch 6a is in the OFF state, there is provided a waveform (7) of the period indicated by $T_B$, that is, the 0 level.

To the time base circuit 44 is supplied from its synchronizing signal input terminal 45 such a synchronizing signal (9) as depicted in FIG. 3 which are synchronized with a light signal.

A waveform (13) which is applied from the control circuit 9 to the switch 6a and the time base circuit 44 is such as illustrated in FIG. 13. When supplied with the waveform (13) of FIG. 13, the time base circuit 44 generates waveforms (11) and (13) depicted in FIG. 13. The period of a level H (a high voltage level) of the waveform (12) shown in FIG. 13 is set to be shorter than the period $T_B$. The period of the level H of the waveform (11) depicted in FIG. 13 is set to be shorter than the period $T_A$. When the waveform (13) of FIG. 13 changes from a level L (a low voltage level) to the level H and becomes sufficiently stable, the waveform (11) of FIG. 13 rises up to the level H from the level L. When the waveform (11) of FIG. 13 assumes the level H, the time base circuit 44 becomes operable in response to the synchronizing signal (19) of FIG. 13 and operates in synchronism therewith to generate a sawtooth waveform (8) indicated by the solid line in FIG. 13. The time base circuit 44 includes a circuit for generating a staircase (8) indicated by the broken line in FIG. 13 and compares the levels of the staircase and the sawtooth wave to produce pulses at each point of coincidence between them. That is, at the intersections of the sawtooth wave and the staircase shown in the waveforms (8) of FIG. 3, sampling command pulses (10) depicted in FIG. 13 are generated. The command pulses (10) are applied to the shaping circuit 23 of the amplifier unit 10a and, at the same time, rendered into sampling pulses of very small width and also provided to the sampling head 14a to perform sampling. The sampled points are indicated by dots 50 in the waveform (7) of FIG. 13. For each sampling, the staircase advances by one step, as indicated by the broken line in the waveform (8) of FIG. 13, and the sawtooth waveform is also terminated. After a certain hold-off period the sawtooth waveform (8) of FIG. 13 is produced again in response to the synchronizing signal (9) of FIG. 13 and the abovesaid operations are repeated. Thus, a low-frequency waveform, similar to the signal waveform (7) of FIG. 13 which has amplitudes of the points 50 and changes in a staircase manner, is derived at the output terminal 24.

When the waveform (11) of FIG. 13 assumes the level L, no sawtooth waveform (8) is produced irrespective of the application of the synchronizing signal (9), and the staircase is reset.

In the period $T_B$, when the waveform (12) of FIG. 13 rises up to the level H, the sampling command pulses (10) of FIG. 13 are generated to sample the 0 level, as indicated by the dots 50 in the waveform (7) of FIG. 13. As a result of this, the 0 level is outputted at the output terminal 24 of the amplifier unit 10a, thereby causing the step wave of FIG. 13 to advance. When the waveform of FIG. 13 lowers to the level L, the staircase is reset. In the period from this resetting to the generation of the next staircase, the time base circuit 44 sends out a luminance modulation signal, not shown, which is applied via the Z-axis modulator 43 to the Z-axis of the CRT 40 to prevent generation of a trace.

When the waveform (11) of FIG. 13 rises up to the level H again, the abovesaid operations are repeated.

The staircase indicated by the broken line in the waveform (8) of FIG. 13 is derived from the time base circuit 44 and applied via the X-axis deflection circuit 42 to the X-axis of the CRT 40. The staircase having the levels of the many points 50 and points 51, shown in the waveform (7) of FIG. 13, is outputted from the amplifier unit 10a and applied via the Y-axis deflection circuit 41 to the Y-axis of the CRT 40. In a period other than the period of resetting the staircase and the period of no staircase being generated, pulses, not shown, are generated by the time base circuit 44 and applied via the Z-axis circuit 43 to the Z-axis of the CRT 40 for intensity modulation. As a consequence, there are produced on the screen of the CRT 40 waveforms displayed by bright spots 52 and 53 respectively corresponding to the points 50 and 51 in the waveform (7) of FIG. 13, as shown in FIG. 14.

In the example of FIG. 13 no sawtooth wave is generated while the waveform (12) of FIG. 13 is at the level H in the period $T_B$; but, also while the waveform (12) of FIG. 13 is at the level H, it is possible to generate the sampling command pulses (10) by producing the sawtooth waveform and by comparing it with the staircase.

In FIG. 13 the description has been given of the case where use is made of an external synchronizing signal synchronized with the light signal; however, it is also possible to provide the synchronizing signal by obtaining the waveform (7) of the light signal of FIG. 13 across the resistor 5a in FIG. 24 and amplifying it by a wide-band amplifier.

Figure 25:
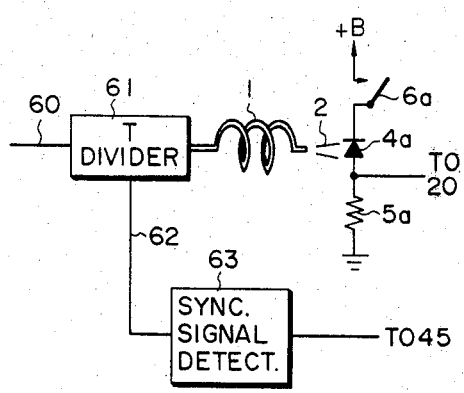
FIG. 25 is a circuit diagram showing a modified form of a light signal input part in this invention.

Further, it is also possible to adopt such a light signal input part as depicted in FIG. 25. Reference numerals 60 and 62 indicate optical fibers; 61 designates a T-divider for dividing light into two; 63 identifies a synchronizing signal detector, which comprises a photo detector and a wide-band amplifier; and 64 denotes a synchronizing signal output terminal, which is connected to the input terminal 45 of the time axis circuit 44. The other elements 1, 4a, 5a and 6a are identical with those utilized in FIG. 23 and hence will not be described. The fiber 1 has an appropriate length (of 10 to 50 m, for example,) for sufficiently delaying the optical signal. Even if the optical signal is delayed by this long fiber 1, there is substantially no loss in information of the light 2 available from the terminating end of the fiber 1 by virture of the wide-band and the low-loss property of the fiber. By using the fiber 1 of such an appropriate length it is possible to observe the optical signal from the moment of rising of its signal waveform. In this case, light propagated in the space may also be introduced in place of using the fiber 60. The photo detector used in the synchronizing signal detector 63 need not be of excellent linearity, and for this photo detector, a high-sensitivity and high-speed one is suitable.

Figure 26:
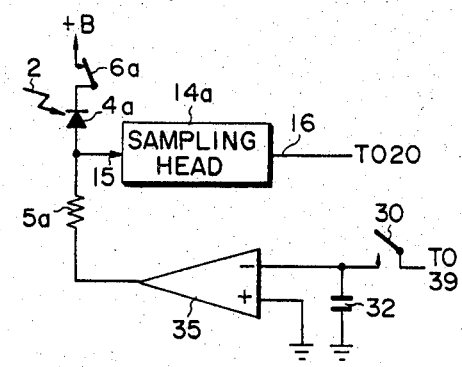
Figure 27:
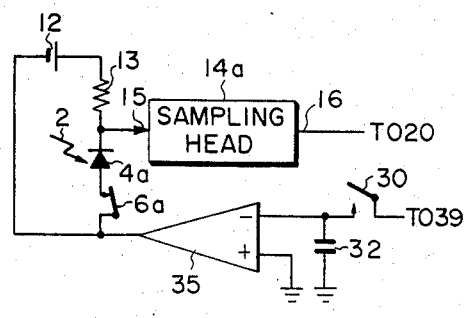

One part of the circuit shown in FIg. 24 may also be modified as shown in FIGS. 26 and 27, in which like reference numerals are used for the same elements as those in FIG. 24. In FIG. 27, reference numeral 12 indicates a bias source.

In FIG. 24, it is also possible to substitute the resistor 33 and the potentiometer 34 with a constant current source whose current value is adjustable, thereby to provide a DC offset voltage (for changing the value of the 0 level of the waveform (7) shown in FIG. 13 at the output terminal 24.

Further, the circuit of FIGS. 26 and 27 may also be modified as shown in FIG. 18, in which reference numeral 37 indicates an amplifier connected between the output terminal 24 and the switch 30. If a differential amplifier of a large gain and of a small drift is employed as the amplifier 37, its comparing operation will further enhance the drift eliminating effect. One of two input terminals of the amplifier 37 is grounded, but DC offsetting can be effected by applying a variable voltage to this terminal.

In a case where the light signal is in a pulse-like form in FIG. 23, if it is desired to observe the optical signal from rising of its waveform, it is also possible to interconnect the photo detector 11a and the amplifier unit 10a with a coaxial cable of a suitable length (10 to 50 m). In FIGS. 24, 26 and 27, when the drift of the sampling circuit including the sampling head 14a and so forth is negligible, the negative feedback path composed of the switch 30, the capacitor 32, the buffer amplifier 35, the resistor 37 and the resistor 36 may also be left out.

Figure 28:
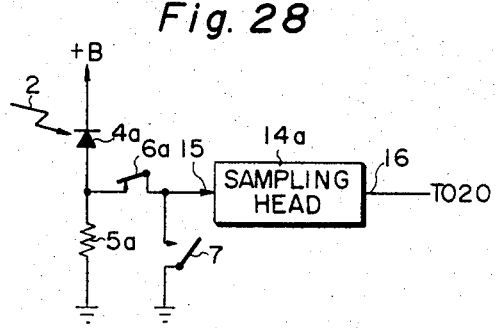

Further, a portion of the circuit shown in FIG. 2 may also be modified as depicted in FIG. 28, in which reference numeral 7 indicates a switch and the other reference numerals are the same as those in FIG. 24. When the switch 6a is turned ON and OFF, the switch 7 is turned OFF and ON.

In FIG. 24, the switch 6a and the photo detector 4a may be replaced by each other in the connection order.

As will be apparent from the foregoing description, the present invention permits simultaneous observation of the waveform of a light signal and the 0 level, and hence is of great utility when employed in the field of optical communications and the like.

What I claim is:

1. A light signal observation device comprising; in combination: light receiving means for detecting a light signal; light intermitting means for intercepting or passing therethrough the light signal incident to the light receiving means; amplifying means for amplifying the output from the light receiving means; time base signal generating means for generating a sawtooth wave in synchronism with the light signal passed by the light intermitting means and while the light signal is intercepted and for generating a luminance modulation signal in the period of generation of the sawtooth wave; and display means for displaying a light signal waveform including a 0 level on the basis of the output signal from the amplifying means and the sawtooth wave and the luminance modulation signal from the time base signal generating means.

2. A light signal observation device comprising, in combination, light receiving means for detecting a light signal, light intermitting means for intercepting or passing therethrough the light signal incident to the light receiving means, amplifying means provided with a negative feedback path including switching means responsive to the operation of the light intermitting means to be turned ON and OFF for amplifying the output from the light receiving means; storage means for storing a feedback voltage while the negative feedback path is established; time base signal generating means for generating a sawtooth wave in synchronism with the light signal while the negative feedback path is cut off and also while the negative feedback path is established and for generating a luminance modulation signal in the period of generation of the sawtooth wave; and display means for displaying a light signal waveform including a 0 level on the basis of the output signal from the amplifying means and the sawtooth wave and the luminance modulation signal from the time base signal generating means.

3. A light signal observation device according to claim 2, wherein the amplifying means comprises a first amplifier receiving the output from the light receiving means to provide an amplified output, and a second amplifier including a negative feedback path formed via a switch responsive to the operation of the light intermitting means to be turned ON and OFF and receiving the output from the first amplifier to provide an amplified circuit.

4. An optical signal observation device according to claim 2, wherein the amplifying means comprises a first amplifier receiving the output from the light receiving means to provide an amplified output, a second amplifier receiving the output from the first amplifier to provide an amplified output, and a negative feedback path formed between the input of the first amplifier and the output of the second amplifier via a switch responsive to the operation of the light intermitting means to be turned ON and OFF.

5. A light signal observation device according to claim 4, wherein a feedback path including a resistance element is connected to the first amplifier, and wherein the output from the light receiving means is applied to the first amplifier to provide an amplified output.

6. A light signal observation device according to claim 5, wherein the output of the second amplifier is connected via a resistance element to a power source.

7. A light signal observation device according to claim 2, wherein the amplifying means comprises a first amplifier receiving the output from the light receiving means to provide an amplified output, a second amplifier receiving the output from the first amplifier to provide an amplified output, and a negative feedback path formed between the input of the first amplifier and the output of the second amplifier via a switch responsive to the operation of the light intermitting means to be turned ON and OFF, a third amplifier and a resistance element.

8. A light signal observation device according to claim 7, wherein the negative feedback path comprises a third amplifier having its output connected via a resistor to the input of the first amplifier, a fourth amplifier having its input connected to the output of the second amplifier, and a switch connected between the output of the fourth amplifier and the input of the third amplifier and responsive to the operation of the light intermitting means to be turned ON and OFF.

9. An optical signal observation device according to claim 2, wherein the light intermitting means is a rotary disc having holes for passing therethrough the optical signal and a base portion for intercepting the light signal.

10. An optical signal observation device according to claim 2, wherein the light intermitting means is a light modulator using ultrasonic waves.

11. An optical signal observation device according to claim 2, wherein the optical signal is divided by T-divider means into two, one being delayed by light delay means and applied to the light intermitting means and the other being applied to synchronizing signal detector means to derive therefrom a synchronizing signal.

12. A light signal observation device, comprising: light receiving means for detecting a light signal, light intermitting means for intercepting or passing therethrough the light signal incident to the light receiving means, sampling means for obtaining, by sampling, a low-frequency signal similar in the waveform to the output from the light receiving means while the light signal is incident thereto and a 0 level signal while the light signal is intercepted, time base signal generating means for generating a time base signal, and display means for displaying the low-frequency signal and the 0 level signal in synchronism with said time base signal, whereby a light signal waveform including the 0 level is displayed.

13. A light signal observation device comprising: light receiving means for detecting a light signal; light intermitting means for intercepting or passing therethrough the light signal incident to the light receiving means; sampling means for obtaining, by sampling, a low-frequency signal similar in waveform to the output from the light receiving means while the light signal is incident thereto and a 0 level signal while the light signal is intercepted; time base signal generating means for generating a time base signal; amplifying means having a negative feedback path formed between the output and the input of the sampling circuit via switching means opening and closing in response to the operation of the light intermitting means; storing means for storing a feedback voltage produced while the negative feedback voltage is established; and display means for displaying the low-frequency signal and the 0 level signal in synchronism with with said time base signal, whereby an optical signal waveform including the 0 level is displayed.

14. A light signal observation device according to claim 13, wherein the negative feedback path comprises a first amplifier having its output connected via a resistance element to the input of the sampling circuit, a second amplifier having its input to the output of the sampling circuit, and a switch connected between the output of the second amplifier and the input of the first amplifier and responsive to the operation of the light intermitting means to be turned ON and OFF.

15. A light signal observation device according to claim 13, wherein the time base signal generating means is arranged so that it generates sampling command pulses in the phase a little different from that of each of successively arriving light signals and generates the sampling command pulses also while the light signal is intercepted, that it generates a staircase in response to the sampling command pulses and resets the staircase regardless of whether the light signal is incident to the light receiving means or intercepted and that it generates a luminance modulation signal in the time interval between the resetting of the staircase and generation of the staircase, wherein the sampling circuit is arranged so that it samples the output from the light receiving means by the sampling command pulses supplied from the time base signal generating means and that it generates a low-frequency signal similar in the waveform to the light signal when the light signal in incident to the light receiving means and generates a 0 level signal when the light signal is intercepted, and wherein in the low-frequency signal similar in the waveform in the light signal and the 0 level signal, the staircase and the luminance modulation signal are respectively applied to the Y-axis, X axis and Z axis of the display means, thereby to display a light signal waveform including the zero level.

16. A light signal observation device according to claim 13, wherein the light intermitting means is a rotary disc having holes for passing therethrough the light signal and a base portion for intercepting the light signal.

17. A light signal observation device according to claim 13, wherein the light intermitting means is a light modulator using ultrasonic waves.

18. A light signal observation device according to claim 13, wherein the light signal is divided by T-junction means into two, one being delayed by light delay means and applied to the light intermitting means and the other being applied to synchronizing signal detector means to derive therefrom a synchronizing signal.

19. A light signal observation device comprising, in combination: light receiving switch means; light receiving means for detecting a light signal and converting it into an electrical signal while the light receiving switch means operates; amplifying means for amplifying the output from the light receiving means; time base signal generating means for generating a sawtooth wave in synchronism with the light signal, generating the sawtooth wave also when no output is derived from the light receiving means and generating a luminance generation signal while the sawtooth wave is generated; and display means for displaying a light signal waveform including the 0 level on the basis of the output signal from the amplifying means and the sawtooth wave and the luminance modulation signal from the time base signal generating means.

20. A light signal observation device comprising, in combination: light receiving switch means; light receiving means for detecting a light signal and converting it into an electrical signal while the light receiving switch means operates; amplifying means provided with a negative feedback path having switching means opening and closing in reponse to the operation of the light receiving switch means for amplifying the output from the light receiving means; storing means for storing a feedback voltage while the negative feedback path is established; time base signal generating means for generating a sawtooth wave in synchronism with the light signal while the negative feedback path is cut off, for generating the sawtooth signal also while the negative feedback path is set up and for generating a luminance modulation signal while the sawtooth wave is generated; and display means for displaying a light signal waveform including the 0 level on the basis of the output signal from the amplifying means and the sawtooth wave and the liminance modulation signal from the time base signal generating means.

21. A light signal observation device according to claim 20, wherein the amplifying means comprises a first amplifier supplied with the output from the light receiving means to provide an amplified output and a second amplifier including a negative feedback path formed via a switch responsive to the operation of the light intermitting means to be turned ON and OFF and supplied with the output from the first amplifier to provide an amplified output.

22. A light signal observation device according to claim 20, wherein the amplifying means comprises a first amplifier supplied with the output from the light receiving means to provide an amplified output, a second amplifier supplied with the output from the first amplifier to provide an amplified output, and a negative feedback path formed between the input of the first amplifier and the output of the second amplifier via a switch responsive to the operation of the light intermitting means to be turned ON and OFF.

23. A light signal observation device according to claim 21, wherein a feedback path including a resistance element is connected to the first amplifier, and wherein the output from the light receiving means is applied to the first amplifier to provide an amplifier output.

24. A light signal observation device according to claim 20, the light receiving switch means is connected in series to the light receiving means.

25. A light signal observation device according to claim 20, wherein the light receiving switch means comprises a first switch connected between the light receiving switch and the input of the amplifying means and a second switch connected between the input of the amplifying switch and ground.

26. A light signal observation device according to claim 20, wherein the light signal is divided by T-divider means into two, one being delayed by light delay means and applied to the light receiving means and the other being applied to synchronizing signal detector means to derive therefrom a synchronizing signal.

27. A light signal observation device, comprising: light receiving switch means, light receiving means for detecting a light signal and converting it into an electrical signal while the light receiving switch means operates, a sampling circuit and time base signal generating means for obtaining, by sampling, a low-frequency signal similar in the waveform to the output from the light receiving means when the light receiving switch means is operative and a 0 level signal when the light receiving switch means is inoperative, and display means for displaying the low-frequency signal and the 0 level signal, whereby a light signal waveform including the 0 level is displayed.

28. A light signal observation device, comprising light receiving switch means, light receiving means for detecting an optical signal and converting it into an electrical signal while the light receiving switch means operates, a sampling circuit and time base signal generating means for obtaining, by sampling, a low-frequency signal similar in the waveform to the output from the light receiving means when the light receiving switch means is operative and a 0 level signal when the light receiving switch means is inoperative, amplifying means provided with a negative feedback path formed between the output and the input of the sampling circuit via switching means opening and closing in response to the operation of the light receiving switch means, storing means for storing a feedback voltage produced while the negative feedback path is established, and display means for displaying the low-frequency signal and the 0 level signal, whereby a light signal waveform including the 0 level is displayed.

29. A light signal observation device according to claim 28, wherein the negative feedback path comprises a first amplifier having its output connected via a resistance element to the input of the sampling circuit, a second amplifier having its input to the output of the sampling circuit, and switch connected between the output of the second amplifier and the input of the first amplifier and responsive to the operation of the light intermitting means to be turned ON and OFF.

30. A light signal observation device according to claim 29, wherein the time base signal generating means is arranged so that it generates sampling command pulses in the phase a little different from that of each of successively arriving light signals and generates the sampling command pulses also while the light receiving switch means is cut off, that it generates a staircase in response to the sampling command pulses and resets the staircase regardless of whether the light receiving means is cut off and that it generates a luminance modulation signal in the time interval between the resetting of the staircase and generation of a next staircase, wherein the sampling circuit is arranged so that it samples the output from the light receiving means by the sampling command pulses supplied from the time base signal generating means and that it generates a low-frequency signal similar in the waveform to the output from the light receiving means when the light receiving means is operative and generates a 0 level signal when the light receiving switch means is inoperative, and wherein the low-frequency signal similar in the waveform to the light signal and the 0 level signal, the staircase and the luminance modulation signal are respectively applied to the Y axis, X axis and Z axis of the display means, thereby to display a light signal waveform including the zero level.

31. A light signal observation device according to claim 28, the light receiving switch means is connected in series to the light receiving means.

32. A light signal observation device according to claim 28, wherein the light receiving switch means comprises a first switch connected between the light receiving switch and the input of the amplifying means and a second switch connected between the input of the amplifying switch and ground.

33. A light signal observation device according to claim 28, wherein the light receiving means is connected in series to the light receiving switch means and provided in the negative feedback path of the sampling circuit, and wherein to the light receiving means is connected in parallel bias means, which comprises a series connection of a resistance element and a bias source.

34. A light signal observation device according to claim 28, wherein the light signal is divided by T-divider means into two, one being delayed by light delay means and applied to the light synchronizing signal detector means to derive therefrom a synchronizing signal.

* * * * *